(12) United States Patent
Kim et al.

(10) Patent No.: US 12,225,535 B2
(45) Date of Patent: Feb. 11, 2025

(54) METHOD AND DEVICE FOR MULTIPLEXING UPLINK CONTROL CHANNELS IN WIRELESS COMMUNICATION SYSTEM

(71) Applicant: Samsung Electronics Co., Ltd., Suwon-si (KR)

(72) Inventors: Yeongsam Kim, Suwon-si (KR); Hayoung Yang, Suwon-si (KR); Youngkwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 17/768,209

(22) PCT Filed: Oct. 8, 2020

(86) PCT No.: PCT/KR2020/013815
§ 371 (c)(1),
(2) Date: Apr. 11, 2022

(87) PCT Pub. No.: WO2021/071323
PCT Pub. Date: Apr. 15, 2021

(65) Prior Publication Data
US 2023/0037846 A1 Feb. 9, 2023

(30) Foreign Application Priority Data
Oct. 10, 2019 (KR) .................. 10-2019-0125468

(51) Int. Cl.
*H04W 72/21* (2023.01)
*H04L 5/00* (2006.01)

(52) U.S. Cl.
CPC ........... *H04W 72/21* (2023.01); *H04L 5/0051* (2013.01)

(58) Field of Classification Search
CPC ............. H04W 72/21; H04W 72/1268; H04W 72/535; H04L 5/0051; H04L 5/0053;
(Continued)

(56) References Cited

U.S. PATENT DOCUMENTS 10,142,080 B2   11/2018   Lee et al.
2014/0050176 A1  2/2014   Lin et al.
(Continued)

FOREIGN PATENT DOCUMENTS

CN   107566080 A   1/2018
EP   3547773 A1   10/2019
(Continued)

OTHER PUBLICATIONS

Notice of Preliminary Rejection dated Mar. 16, 2023, in connection with Korean Application No. 10-2019-0125468, 11 pages.
(Continued)

*Primary Examiner* — Chae S Lee

(57) ABSTRACT

The present disclosure relates to a $5^{th}$ generation (5G) or pre-5G communication system for supporting a higher data transmission rate than $4^{th}$ generation (4G) communication systems such as long-term evolution (LTE). The present disclosure is for managing uplink control channels in a wireless communication system, and an operation method for a base station may include the steps of: allocating an uplink control channel of a first format to a first terminal; allocating an uplink control channel of a second format to a second terminal on the basis of a resource of the first format; and transmitting information about the uplink control channel allocation.

14 Claims, 10 Drawing Sheets

(58) Field of Classification Search
CPC ............... H04L 27/2613; H04L 5/0037; H04L 27/2605; H04J 13/22
See application file for complete search history.

(56) References Cited

U.S. PATENT DOCUMENTS

| | | | |
|---|---|---|---|
| 2018/0076917 A1 | 3/2018 | Pan et al. | |
| 2018/0192416 A1 | 7/2018 | Yin et al. | |
| 2018/0192417 A1 | 7/2018 | Yin et al. | |
| 2018/0220414 A1 | 8/2018 | Yin et al. | |
| 2018/0220415 A1 | 8/2018 | Yin et al. | |
| 2018/0279298 A1 | 9/2018 | Wang et al. | |
| 2018/0324787 A1 | 11/2018 | Yin et al. | |
| 2018/0368137 A1 | 12/2018 | Yin et al. | |
| 2019/0150169 A1 | 5/2019 | Wang et al. | |
| 2019/0159193 A1 | 5/2019 | Zhang et al. | |
| 2019/0349922 A1* | 11/2019 | Xu | H04W 72/0446 |
| 2020/0280980 A1 | 9/2020 | Myung et al. | |
| 2020/0322199 A1* | 10/2020 | Matsumura | H04L 5/0051 |
| 2021/0050895 A1 | 2/2021 | Kang et al. | |
| 2022/0103411 A1* | 3/2022 | Noh | H04L 5/0051 |

FOREIGN PATENT DOCUMENTS

| | | | | |
|---|---|---|---|---|
| JP | 5823025 B2 | 11/2015 | | |
| KR | 20180135851 A | 12/2018 | | |
| KR | 10-2019-0029508 A | 3/2019 | | |
| KR | 20190029508 A | 3/2019 | | |
| WO | 2017098414 A1 | 6/2017 | | |
| WO | 2019032741 A1 | 2/2019 | | |
| WO | 2019103914 A1 | 5/2019 | | |
| WO | WO-2019095312 A1 * | 5/2019 | ........... H04L 5/0037 |

OTHER PUBLICATIONS

International Search Report and Written Opinion of the International Searching Authority dated Jan. 26, 2021, in connection with International Application No. PCT/KR2020/013815, 9 pages.

Notice of Final Rejection dated Jul. 26, 2023, in connection with Korean Application No. 10-2019-0125468, 9 pages.

Supplementary European Search Report dated Oct. 17, 2022, in connection with European Application No. 20874776.6, 8 pages.

* cited by examiner

METHOD AND DEVICE FOR MULTIPLEXING UPLINK CONTROL CHANNELS IN WIRELESS COMMUNICATION SYSTEM

CROSS-REFERENCE TO RELATED APPLICATIONS

This application is a 371 National Stage of International Application No. PCT/KR2020/013815, on Oct. 8, 2020, which claims priority to Korean Patent Application No. 10-2019-0125468, filed Oct. 10, 2019, the disclosures of which are herein incorporated by reference in their entirety.

BACKGROUND

1. Field

The disclosure relates in general to a wireless communication system and, more particularly, to a method and a device for multiplexing uplink control channels in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultra-higher frequency (mmWave) bands (e.g., 60 GHz bands) so as to accomplish higher data rates. To decrease the propagation loss and increase the transmission distance of the radio waves in the ultra-higher frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, technical development for system network improvement is under way based on advanced small cells, cloud radio access networks (cloud RANs), ultra-dense networks, device-to-device (D2D) communication, wireless backhaul, moving network, cooperative communication, coordinated multi-points (COMP), reception-end interference cancellation and the like.

In the 5G system, hybrid frequency shift keying and quadrature amplitude modulation (FQAM) and sliding window superposition coding (SWSC) as an advanced coding modulation (ACM) scheme, and filter bank multi carrier (FBMC), non-orthogonal multiple access (NOMA), and sparse code multiple access (SCMA) as an advanced access technology have also been developed.

A new radio (NR) physical uplink control channel (PUCCH) is a physical channel made to transmit channel state information (CSI), scheduling request (SR), and hybrid automatic retransmit request (HARQ-ACK/NACK). The PUCCH has been defined in various formats for the size of transmitted information, coverage guarantee, and the like.

SUMMARY

Based on the above discussion, the disclosure provides a device and a method for efficiently using resources for an uplink control channel.

In addition, the disclosure provides a device and a method for multiplexing uplink control channels having different formats to a terminal in a wireless communication system.

In addition, the disclosure provides a device and a method for maintaining a cyclic shift (CS) interval allocated to a terminal in a wireless communication system, and additionally allocating a resource to the terminal accordingly.

According to various embodiments of the disclosure, an operation method of a base station in a wireless communication system may include allocating an uplink control channel of a first format to a first terminal, allocating an uplink control channel of a second format to a second terminal based on resource of the first format, and transmitting information on allocation of the uplink control channel.

According to various embodiments of the disclosure, a base station in a wireless communication system includes a transceiver and at least one processor connected to the transceiver. The at least one processor may allocate an uplink control channel of a first format to a first terminal, and allocate an uplink control channel of a second format to a second terminal based on a resource of the first format, and the transceiver may transmit information on the allocation of the uplink control channel.

According to various embodiments of the disclosure, an operation method of a terminal in a wireless communication system may include receiving information on allocation of an uplink control channel of a second format from a base station, based on a resource of a first format, transmitting control information through the uplink control channel.

According to various embodiments of the disclosure, a terminal in a wireless communication system includes a transceiver. The transceiver may receive information on allocation of an uplink control channel of a second format from a base station, based on a resource of a first format, and transmit control information through the uplink control channel.

A device and a method according to various embodiments of the disclosure may increase the efficiency of resources used for an uplink control channel.

Advantageous effects obtainable from the disclosure may not be limited to the above-mentioned effects, and other effects which are not mentioned may be clearly understood, through the following descriptions, by those skilled in the art to which the disclosure pertains.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, the present disclosure relates to an apparatus and method for allocating an uplink control channel to a terminal in a wireless communication system. Specifically, the present disclosure describes a technique for multiplexing channels by allocating the same resource to uplink control channels having different formats in a wireless communication system.

Terms referring to signals used in the following description, channels, control information, network entities, device components, state of channels, etc. are exemplified for convenience of explanation. Accordingly, the disclosure is not limited to the terms described below, and other terms having equivalent technical meanings may be used.

In addition, in the disclosure, in order to determine whether a specific condition is satisfied or fulfilled, an expression of more than or less than is used, but this is only a description to express an example and does not exclude a description of not less than or not more than. Conditions described as 'not less than' may be replaced with 'more than', conditions described as 'not more than' may be replaced with 'less than', and conditions described as 'not less than and not more than' may be replaced with 'more than and less than'.

In addition, the disclosure describes various embodiments using terms used in some communication standards (e.g., 3GPP (3rd generation partnership project), but this is only an example for description. Various embodiments of the disclosure may be easily modified and applied in other communication systems.

Figure 1:
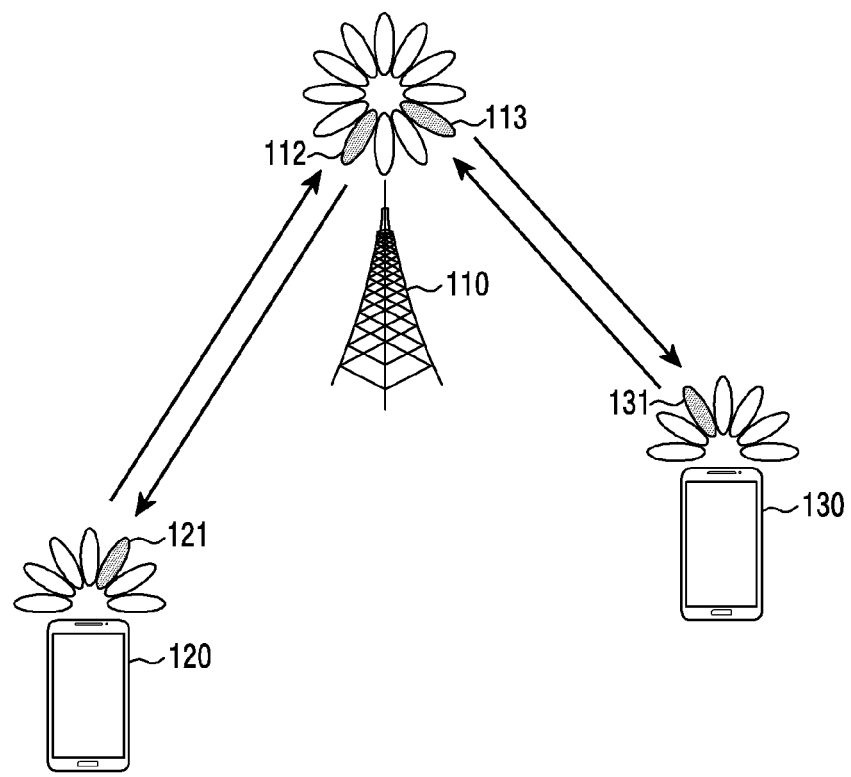
FIG. 1 illustrates a wireless communication system according to various embodiments of the disclosure.

FIG. 1 illustrates a wireless communication system according to various embodiments of the disclosure. FIG. 1 illustrates a base station 110, a terminal 120, and a terminal 130 as part of nodes using a wireless channel in a wireless communication system. FIG. 1 illustrates only one base station, but may further include another base station that is the same as or similar to the base station 110.

The base station 110 is a network infrastructure that provides wireless access to terminals 120 and 130. The base station 110 has coverage defined as a predetermined geographic area based on a distance capable of transmitting a signal. In addition to the base station, the base station 110 may be referred to as an 'access point (AP)', an 'eNodeB (eNB)', '5G node (5th generation node), 'next generation nodeB (gNB), 'wireless point', 'transmission/reception point (TRP)', or other terms having a technical meaning equivalent thereto.

Each of the terminal 120 and the terminal 130 is a device used by a user, and performs communication with the base station 110 through a wireless channel. In some cases, at least one of the terminal 120 and the terminal 130 may be operated without the user's involvement. That is, at least one of the terminal 120 and the terminal 130 is a device that performs machine type communication (MTC) and may not be carried by a user. Each of the terminal 120 and the terminal 130 may be referred to as 'user equipment (UE)', 'mobile station', 'subscriber station', 'remote terminal', 'wireless terminal', 'user device', or other terms having an equivalent technical meaning in addition to terminal.

The base station 110, the terminal 120, and the terminal 130 may transmit and receive wireless signals in millimeter wave (mmWave) bands (e.g., 28 GHz, 30 GHz, 38 GHz, and 60 GHz). In this case, in order to improve the channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a quasi co-located (QCL) relationship with the resource transmitting the serving beams 112, 113, 121, and 131.

If large-scale characteristics of the channel delivering the symbol on the first antenna port can be inferred from the channel delivering the symbol on the second antenna port, the first antenna port and the second antenna port may be evaluated to be in a QCL relationship. For example, the large-scale characteristics may include at least one of delay spread, Doppler spread, Doppler shift, average gain, average delay, and a spatial receiver parameter.

Figure 2:
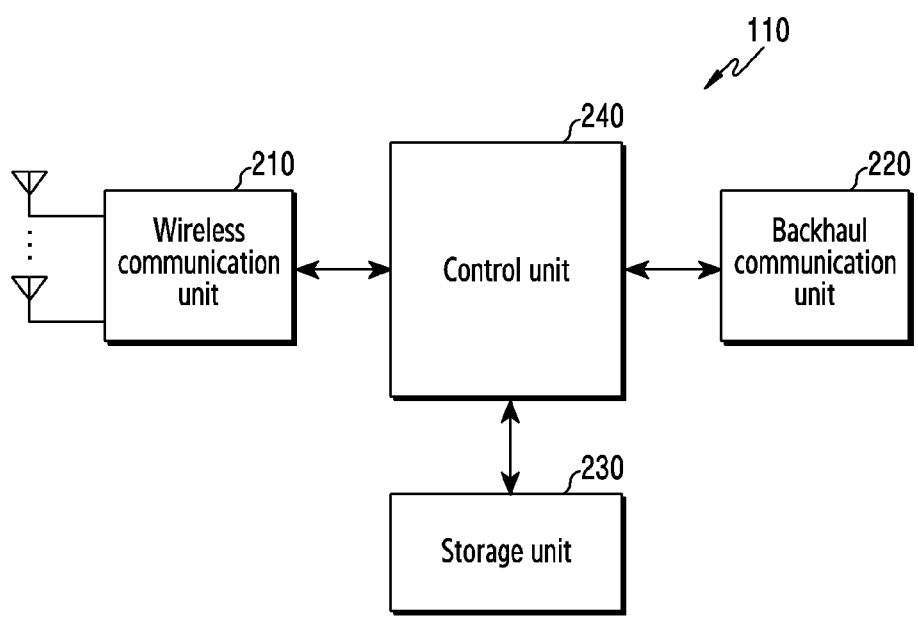
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. Terms such as ' . . . unit', etc. used below refers to a unit that processes at least one function or operation, and may be implemented by hardware, software, or a combination of hardware and software.

Referring to FIG. 2, the base station includes a wireless communication unit 210, a backhaul communication unit 220, a storage unit 230, and a control unit 240.

The wireless communication unit 210 may perform functions for transmitting and receiving signals through a wireless channel. For example, the wireless communication unit 210 may perform a conversion function between a baseband signal and a bit string according to a physical layer standard of a system. For example, when transmitting data, the wireless communication unit 210 generates complex symbols by encoding and modulating a transmission bit string. In addition, when receiving data, the wireless communication unit 210 restores the received bit string through demodulation and decoding of the baseband signal.

In addition, the wireless communication unit 210 up-converts the baseband signal into a radio frequency (RF) band signal and transmits the RF band signal through an antenna, and down-converts the RF band signal received through the antenna into a baseband signal. To this end, the wireless communication unit 210 may include a transmission filter, a reception filter, an amplifier, a mixer, an oscillator, a digital to analog convertor (DAC), an analog to digital convertor (ADC), and the like. In addition, the wireless communication unit 210 may include a plurality of transmission/reception paths. Furthermore, the wireless communication unit 210 may include at least one antenna array composed of a plurality of antenna elements.

In terms of hardware, the wireless communication unit 210 may be composed of a digital unit and an analog unit, and the analog unit may be composed of a plurality of sub-units according to operating power, operating frequency, and the like. The digital unit may be implemented as at least one processor (e.g., a digital signal processor (DSP)).

The wireless communication unit 210 transmits and receives signals as described above. Accordingly, all or part of the wireless communication unit 210 may be referred to as a 'transmitter', 'receiver', or 'transceiver'. In addition, in the following description, transmission and reception performed through a wireless channel are used as a meaning including performing the above-described processing by the wireless communication unit 210.

The backhaul communication unit 220 provides an interface for performing communication with other nodes in the network. That is, the backhaul communication unit 220 converts a bit string transmitted from a base station to another node, for example, another access node, another base station, an upper node, and a core network, and converts a physical signal received from another node into a bit string.

The storage unit 230 stores data such as a basic program, an application program, and configuration information for the operation of the base station. The storage unit 230 may be configured as a volatile memory, a nonvolatile memory, or a combination of a volatile memory and a nonvolatile memory. In addition, the storage unit 230 provides stored data according to a request by the control unit 240.

The control unit 240 controls overall operations of the base station. For example, the control unit 240 transmits and receives signals through the wireless communication unit 210 or the backhaul communication unit 220. In addition, the control unit 240 writes and reads data in the storage unit 230. In addition, the control unit 240 may perform functions of a protocol stack required by the communication standard. According to another embodiment, the protocol stack may be included in the wireless communication unit 210. To this end, the control unit 240 may include at least one processor. According to various embodiments, the control unit 240 may control the base station to perform operations according to various embodiments to be described later.

Figure 3:
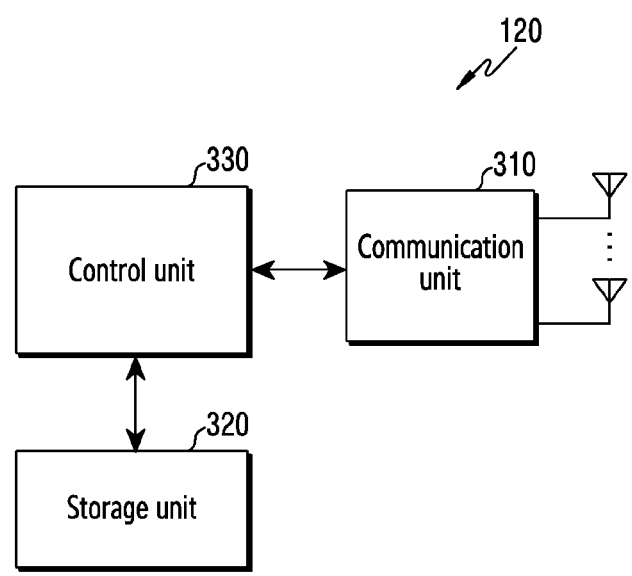
FIG. 3 illustrates a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 may be understood as a configuration of the terminal 120. Terms such as '... unit', etc. used below refers to a unit that processes at least one function or operation, and may be implemented by hardware, software, or a combination of hardware and software.

Referring to FIG. 3, the terminal includes a communication unit 310, a storage unit 320, and a control unit 330.

The communication unit 310 may perform functions for transmitting and receiving signals through a wireless channel. For example, the communication unit 310 may perform a conversion function between a baseband signal and a bit string according to a physical layer standard of a system. For example, when transmitting data, the communication unit 310 generates complex symbols by encoding and modulating a transmission bit string. In addition, when receiving data, the communication unit 310 restores the received bit string through demodulation and decoding of the baseband signal. In addition, the communication unit 310 up-converts the baseband signal into an RF band signal and transmits the RF band signal through an antenna, and down-converts the RF band signal received through the antenna into a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Furthermore, the communication unit 310 may include at least one antenna array composed of a plurality of antenna elements. In terms of hardware, the communication unit 310 may be composed of a digital circuit and an analog circuit (e.g., radio frequency integrated circuit (RFIC)). Here, the digital circuit and the analog circuit may be implemented as a single package. In addition, the communication unit 310 may include a plurality of RF chains. Furthermore, the communication unit 310 may perform beamforming.

The communication unit 310 transmits and receives signals as described above. Accordingly, all or part of the communication unit 310 may be referred to as a 'transmitter', 'receiver', or 'transceiver'. In addition, in the following description, transmission and reception performed through a wireless channel are used as a meaning including performing the above-described processing by the communication unit 310.

The storage unit 320 stores data such as a basic program, an application program, and configuration information for the operation of the terminal. The storage unit 320 may be configured as a volatile memory, a nonvolatile memory, or a combination of a volatile memory and a nonvolatile memory. In addition, the storage unit 320 provides stored data according to a request by the control unit 330.

The control unit 330 controls overall operations of the terminal. For example, the control unit 330 transmits and receives signals through the communication unit 310. In addition, the control unit 330 writes and reads data in the storage unit 320. In addition, the control unit 330 may perform functions of a protocol stack required by the communication standard. To this end, the control unit 330 may include at least one processor or a micro-processor, or may be a part of the processor. In addition, a part of the communication unit 310 and the control unit 330 may be referred to as a communication processor (CP). According to various embodiments, the control unit 330 may control various terminals to perform operations according to various embodiments to be described later.

Figure 4:
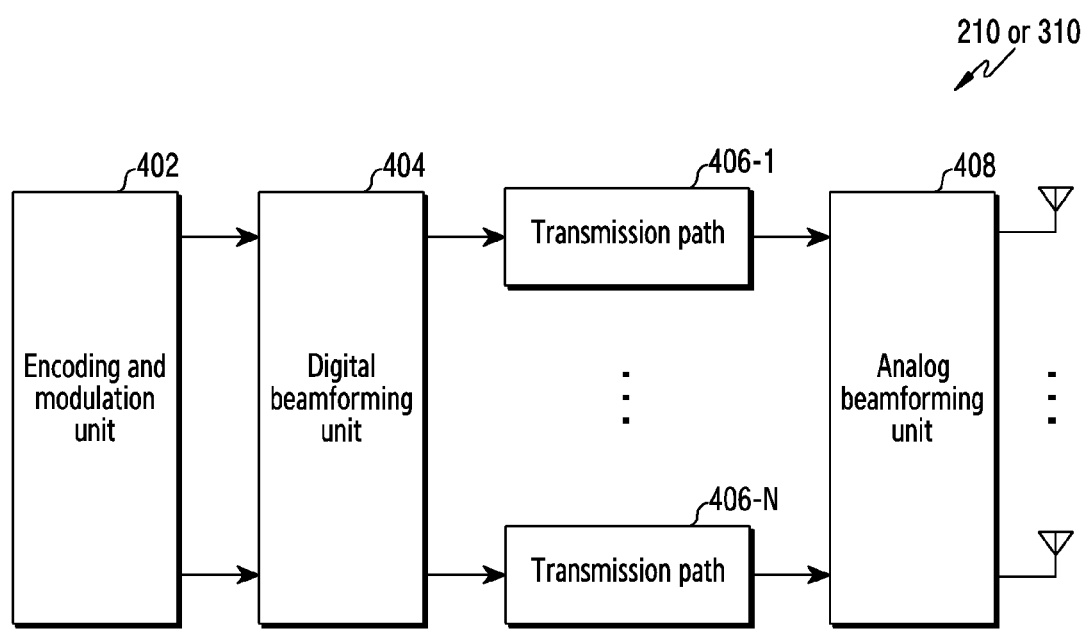
FIG. 4 illustrates a configuration of a communication unit in a wireless communication system according to various embodiments of the disclosure.

FIG. 4 illustrates a configuration of a communication unit in a wireless communication system according to various embodiments of the disclosure. FIG. 4 illustrates an example of a detailed configuration of the wireless communication unit 210 of FIG. 2 or the communication unit 310 of FIG. 3. Specifically, FIG. 4 illustrates components for performing beamforming as a part of the wireless communication unit 210 of FIG. 2 or the communication unit 310 of FIG. 3.

Referring to FIG. 4, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one of a low density parity check (LDPC) code, a convolution code, and a polar code may be used. The encoding and modulation unit 402 generates modulation symbols by performing constellation mapping.

The digital beamforming unit 404 performs beamforming on a digital signal (e.g., modulation symbols). To this end, the digital beamforming unit 404 multiplies the modulation symbols by beamforming weights. Here, the beamforming weights are used to change the magnitude and phase of a signal, and may be referred to as a precoding matrix, a pre-coder, or the like. The digital beamforming unit 404 outputs the digital beamformed modulation symbols to the plurality of transmission paths 406-1 to 406-N. In this case, according to a multiple input multiple output (MIMO) transmission scheme, modulation symbols may be multiplexed or the same modulation symbols may be provided to a plurality of transmission paths 406-1 to 406-N.

A plurality of transmission paths 406-1 to 406-N convert the digital beamformed digital signals into analog signals. To this end, each of the plurality of transmission paths 406-1 to 406-N may include an inverse fast forwarder transform (IFFT) operation unit, a cyclic prefix (CP) insertion unit, a DAC, and an up-conversion unit. The CP insertion unit is for an orthogonal frequency division multiplexing (OFDM) scheme, and may be excluded when another physical layer scheme (e.g., filter bank multi-carrier (FBMC)) is applied. That is, the plurality of transmission paths 406-1 to 406-N provide independent signal processing processes for a plurality of streams generated through digital beamforming. However, depending on the implementation method, some of the components of the plurality of transmission paths 406-1 to 406-N may be used in common.

The analog beamforming unit 408 performs beamforming on an analog signal. To this end, the analog beamforming unit 408 multiplies the analog signals by beamforming weights. Here, the beamforming weights are used to change the magnitude and phase of a signal. Specifically, according to a plurality of transmission paths 406-1 to 406-N and a connection structure between antennas, the analog beamforming unit 408 may be variously configured. For example, each of a plurality of transmission paths 406-1 to 406-N may be connected to one antenna array. As another example, a plurality of transmission paths 406-1 to 406-N may be connected to one antenna array. As another example, a plurality of transmission paths 406-1 to 406-N may be adaptively connected to one antenna array or may be connected to two or more antenna arrays.

Figure 5:
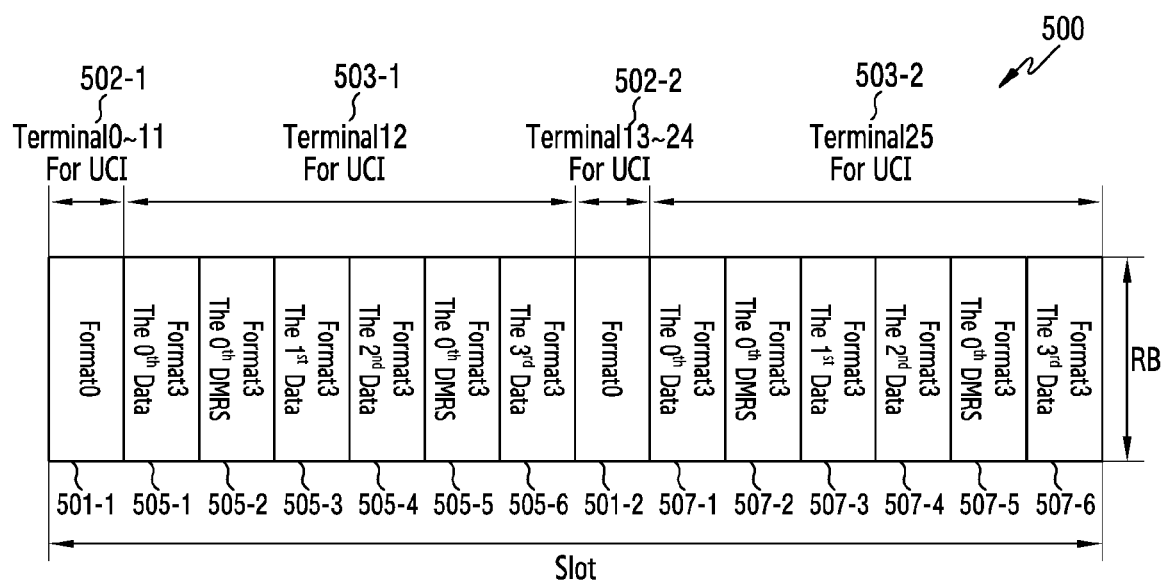
FIG. 5 illustrates an example of a slot for allocating resources to a terminal for each physical uplink control (PUCCH) format in a wireless communication system according to various embodiments of the disclosure.

FIG. 5 illustrates an example of a slot for allocating resources to a terminal for each physical uplink control (PUCCH) format in a wireless communication system according to various embodiments of the disclosure.

FIG. 5 illustrates a configuration example of a slot for allocating resources of a PUCCH format to a terminal. Here, the slot 500 may include a total of 168 REs including 12 subcarriers and 14 symbols. In FIG. 5, one area of the horizontal axis represents a symbol, and one area of the vertical axis represents a resource block (RB). The slot 500 may include resources 501-1 to 501-2, 505-1 to 505-6, and 507-1 to 507-6 allocated for PUCCHs of various formats.

Referring to FIG. 5, PUCCHs of format 0 and PUCCHs of format 3 may be allocated to the slot. Specifically, in the slot 500, the first resources 505-1 to 505-6 may be allocated to terminal 12 503-1, and the second resource 501-1 may be allocated to terminals 0 to 11 502-1. In addition, the third resources 507-1 to 507-6 in the same slot may be allocated to terminal 25 503-2, and the fourth resource 501-2 in the same slot may be allocated to terminals 13 to 24 502-2.

In PUCCH, the location of the demodulation reference signal (DMRS) and the number of symbols are different for each format. Accordingly, resources may be classified and allocated to the terminal for each format. Specifically, resources 501-1 to 501-2 applied in the form of format 0 may be allocated to up to 24 terminals 502-1 to 502-2 for transmitting a scheduling request (SR), etc., and resources applied in the form of format 3 may be allocated to up to two terminals 503-1 to 503-2 for transmitting channel state information (CSI), etc.

Figure 6:
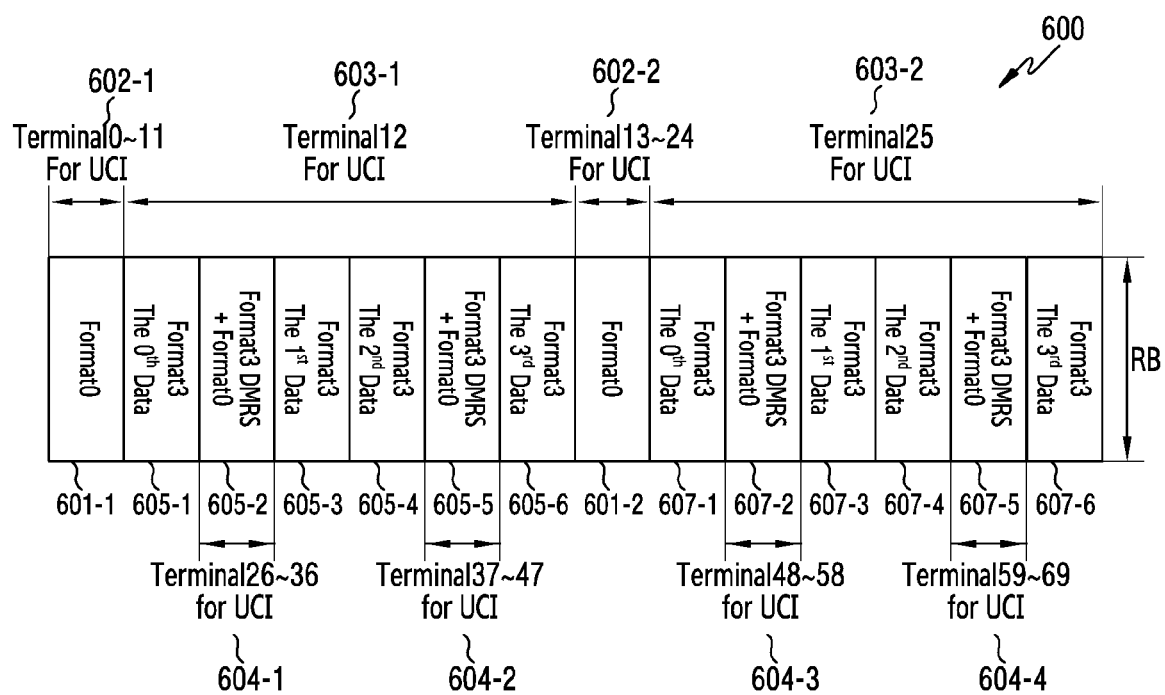
FIG. 6 illustrates an example of a slot for allocating resources to a terminal in a different PUCCH format in a wireless communication system according to various embodiments of the disclosure.

FIG. 6 illustrates an example of a slot for allocating resources to a terminal in a different PUCCH format in a wireless communication system according to various embodiments of the disclosure.

FIG. 6 illustrates a configuration example of a slot for allocating resources of a PUCCH format to a terminal. Here, the slot 600 may include a total of 168 REs including 12 subcarriers and 14 symbols. In FIG. 6, one area of the horizontal axis represents a symbol, and one area of the vertical axis represents a resource block (RB). The slot 600 may include resources 601-1 to 601-2, 605-1 to 605-6, and 607-1 to 607-6 applied in the form of various PUCCH formats.

Referring to FIG. 6, PUCCHs of format 0 and PUCCHs of format 3 may be allocated to the slot. Specifically, in the slot 600, the first resources 605-1 to 605-6 may be allocated to terminal 12 603-1, and the second resource 601-1 may be allocated to terminals 0 to 11 602-1. In addition, the third resources 607-1 to 607-6 in the same slot may be allocated to terminal 25 603-2, and the fourth resource 601-2 in the same slot may be allocated to terminals 13 to 24 602-2.

Additionally, the resources 601-1 to 601-2, 605-1 to 605-6, and 607-1 to 607-6 of the uplink control channel may be allocated to terminals to which format 0 is applied while maintaining orthogonality based on the similarity between the DMRS of a specific format and the signal form of format 0. Here, the specific format may refer to any one of format 1, format 3, and format 4 in the uplink control channel. According to an example of FIG. 6, channel multiplexing may be performed by allocating resource 605-2 of DMRS location of format 3 to terminals 26 to 36 604-1 of a new format 0 in an uplink control channel. Similarly channel multiplexing may be performed by allocating resource 605-5 of DMRS location of format 3 to terminals 37 to 47 604-2 in an uplink control channel, allocating resource 607-2 of DMRS location of format 3 to terminals 48 to 58 604-3 in an uplink control channel, and allocating resource 607-5 of DMRS location of format 3 to terminals 59 to 69 604-4 in an uplink control channel.

In PUCCH, the location of the DMRS and the number of symbols are different for each format. Accordingly, resources may be classified and allocated to the terminal for each format. Specifically, resources 601-1 to 601-2 applied in the form of format 0 may be allocated to up to 24 terminals 610-1 to 601-2 for transmitting a scheduling request (SR), etc., and resources applied in the form of format 3 may be allocated to up to two terminals 603-1 to 603-2 for transmitting channel state information (CSI), etc.

As a result, according to an embodiment of the disclosure, resources 601-1 to 601-2 applied in the form of existing format 0 may be allocated to 24 terminals 602-1 to 602-2 transmitting SRs, etc., and resources applied in the form of format 3 may be allocated to CSI transmission terminals 603-1 to 603-2. Resources 605-2, 605-5, 607-2, and 607-5 of the format 3 DMRS location may be additionally allocated to terminals 26 to 36 604-1, 37 to 47 604-2, 48 to 58 604-3, and 59 to 69 604-4 that are additionally applied in the form of format 0. According to an embodiment illustrated in FIG. 6, according to 44 terminals, the format of format 0 is applied, and additional resource allocation may be applied to 44 terminals transmitting SRs based on the same resource of the DMRS location of format 3, which is a different format of an uplink control channel.

Figure 7:
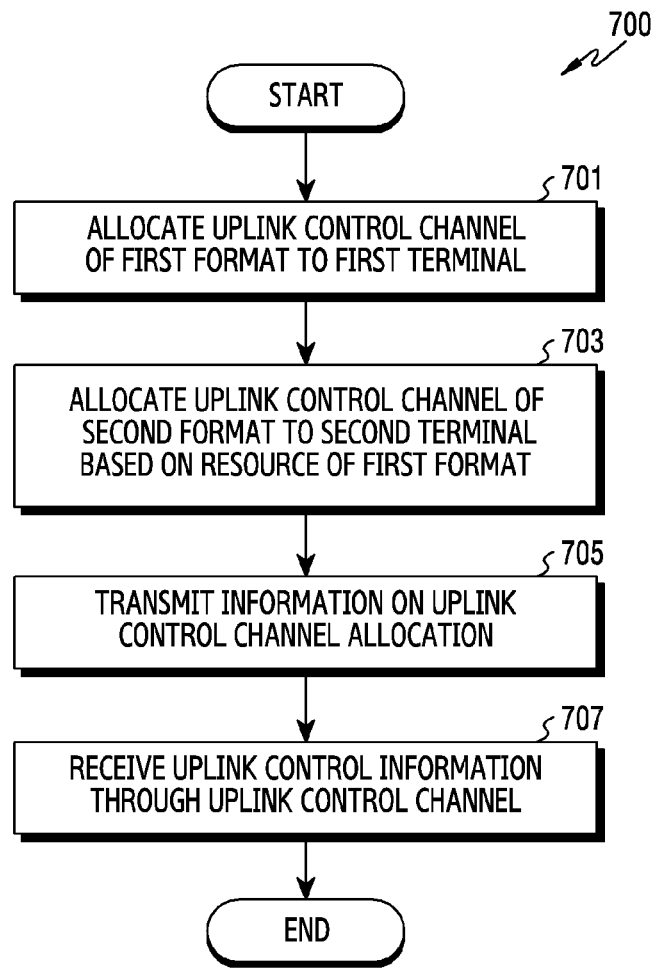
FIG. 7 is a flowchart illustrating a base station that allocates uplink control channel information to a first terminal and a second terminal and performs communication with respect to the allocated information in a wireless communication system according to various embodiments of the disclosure.

FIG. 7 is a flowchart 700 illustrating a base station that allocates uplink control channel information to a first terminal and a second terminal and performs communication with respect to the allocated information in a wireless communication system according to various embodiments of the disclosure. FIG. 7 illustrates an operating method of the base station 110.

Referring to FIG. 7, in step 701, the base station allocates an uplink control channel of the first format to the first terminal. That is, the first terminal, which is an existing terminal, exists as an object for multiplexing a channel by the base station. The base station allocates the uplink control channel of the first format to the first terminal. Here, the first format may refer to one of the remaining formats except for format 0 based on the similarity to format 0 of the uplink control channel.

In step 703, the base station allocates an uplink control channel of the second format to the second terminal based on the resource of the first format. The second terminal, which is a new terminal, exists as an object for multiplexing a channel by the base station. Specifically, when allocating the resource of the uplink control channel of the second format to the second terminal, the base station may allocate an uplink control channel to an additional second terminal based on the similarity between the DMRS of the first format allocated to the first terminal and the signal form of the second format. Here, the resource may include a DMRS, a symbol, and an RB. The base station may perform channel multiplexing on the second terminal, which is a new terminal, using the same resource in different formats.

In step 705, the base station transmits information on uplink control channel allocation. Specifically, after the base station allocates uplink control channels to the first terminal and the second terminal in steps 701 and 703, the base station transmits information on allocation to the first terminal and the second terminal to correspond to the allocated result.

In step 707, the base station receives uplink control information through the uplink control channel. Specifically, based on information on uplink control channel allocation transmitted by the base station, the first terminal and the second terminal transmit uplink control information according to the uplink control channel. Correspondingly, the base station receives uplink control information transmitted by the terminal.

Figure 8:
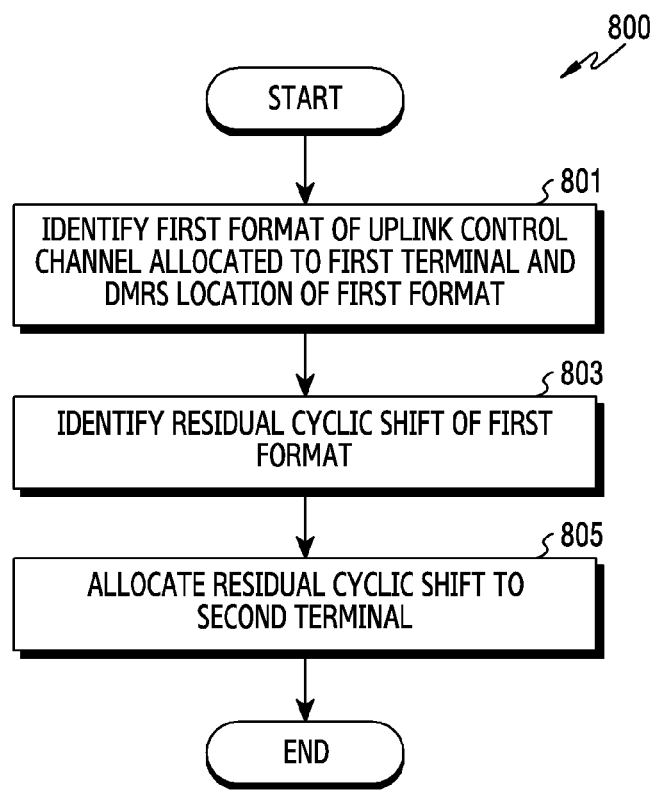
FIG. 8 is a flowchart illustrating a method of allocating a cyclic shift (CS) to a second terminal in a wireless communication system according to various embodiments of the disclosure.

FIG. 8 is a flowchart 800 illustrating a method of allocating a cyclic shift (CS) to a second terminal in a wireless communication system according to various embodiments of the disclosure.

Referring to FIG. 8, in step 801, the base station identifies the first format of the uplink control channel allocated to the first terminal and the DMRS location of the first format. Specifically, in order to allocate an uplink control channel to the second terminal, a first format of the uplink control channel allocated to the first terminal is identified. Here, the first format may include one of uplink control channel formats 1, 3, and 4 except for uplink control channel format 0. Additionally, in order to identify the uplink control channel information allocation location to the second terminal, the DMRS location of the identified first format is identified.

In step 803, the base station identifies the residual cyclic shift of the first format. Specifically, the cyclic shift used in the first format is identified, and the cyclic shift used in the second format is compared. Here, it is determined whether there is a residual cyclic shift not used in the first format.

In step 805, the base station allocates the residual cyclic shift to the second terminal. Specifically, a residual cyclic shift obtained through comparison of the cyclic shift used in the first format and the cyclic shift used in the second format is allocated to the second terminal.

In order to allocate the residual cyclic shift to the second terminal, the residual cyclic shift is determined by comparing the cyclic shift of the first format and the cyclic shift of the second format. Here, the cyclic shift may indicate a value used to determine a signal of an uplink control channel format. Among them, the signal of format 0 of the uplink control channel may be determined in the same way as in Equation 1.

$$e^{j\alpha_l n} \bar{r}_{u,v}(n), 0 \leq n < 12 \quad \text{[Equation 1]}$$

In Equation 1, $\alpha_l$ represents a cyclic shift, $\bar{r}_{u,v}$ represents a base sequence, and $e^{j\alpha_l n}$ represents an orthogonal sequence. Here, the cyclic shift $\alpha_l$ of the uplink control channel format 0 may be determined as illustrated in Equation 2.

$$\alpha_l = \frac{2\pi}{12}\left((m_0 + m_{CS} + n_{CS}(n_{s,f}^u, l + l'))\right) \bmod 12) \quad \text{[Equation 2]}$$

where l is the symbol index.

In Equation 2, $\alpha_l$ represents a cyclic shift, $m_0$ represents an initial cyclic shift as a cyclic shift index, $m_{CS}$ represents a sequence cyclic shift, $n_{CS}$ represents a function of pseudo-random sequence, $n_{s,f}^y$ represents a slot number of a radio frame, l represents an OFDM symbol number in PUCCH transmission, and l' represents an OFDM symbol index in a slot. In the case of uplink control channel format 3 and format 4, DMRSs of uplink control channel format 3 and format 4 allocated to 1 RB may be determined as illustrated in Equation 3.

$$e^{j\alpha_l n} \bar{r}_{u,v}(n), 0 \leq n < 12 \quad \text{[Equation 3]}$$

In Equation 3, $\alpha_l$ represents a cyclic shift, $\bar{r}_{u,v}$ represents a base sequence, and $e^{j\alpha_l n}$ represents an orthogonal sequence. Here, the cyclic shift $\alpha_l$ of the uplink control channel format 3 and format 4 may be determined as illustrated in Equation 4.

$$\alpha_l = \frac{2\pi}{12}\left((m_0 + n_{CS}(n_{s,f}^u, l + l'))\right) \bmod 12) \quad \text{[Equation 4]}$$

where l is the symbol index.

In Equation 4, $\alpha_l$ represents a cyclic shift, $m_0$ represents a cyclic shift index, $n_{CS}$ represents a function of pseudo-random sequence, $n_{s,f}^u$ represents a slot number of a radio frame, l represents an OFDM symbol number in PUCCH transmission, and l' represents an OFDM symbol index in a slot. In this case, in the case of the DMRS of the uplink control channel format 3, $m_0$ is 0, and in the case of the DMRS of the uplink control channel format 4, $m_0$ may be expressed as illustrated in Table 1.

TABLE 1

| Orthogonal sequence index | Cyclic shift index $m_0$ | |
|---|---|---|
| n | $N_{SF}^{PUCCH,4} = 2$ | $N_{SF}^{PUCCH,4} = 4$ |
| 0 | 0 | 0 |
| 1 | 6 | 6 |
| 2 | — | 3 |
| 3 | — | 9 |

The cyclic shift of uplink control channel format 3 and format 4 may be determined based on Equations 4 and Table 1, and the residual cyclic shift may be determined in comparison with the cyclic shift of uplink control channel format 0 determined in Equation 2. In the case of uplink control channel format 1, the DMRS of uplink control channel format 1 allocated to 1 RB may be determined as illustrated in Equation 5.

$$w_i(m)e^{j\alpha_l n}\bar{r}_{u,v}(n), 0 \leq n < 12 \text{ and } 0 \leq m < N_{DMRS}-1 \quad \text{[Equation 5]}$$

In Equation 5, $w_i(m)$ represents an orthogonal sequence multiplied by an mth symbol, i represents an orthogonal sequence index, $\alpha_l$ represents a cyclic shift, and $\bar{r}_{u,v}$ represents a base sequence. In Equation 5, the cyclic shift of uplink control channel format 1 may be determined as in Equation 6.

$$\alpha_l = \frac{2\pi}{12}\left((m_0 + n_{CS}(n_{s,f}^u, l+l'))\right) \mod 12 \quad \text{[Equation 6]}$$

where l is the symbol index.

In Equation 6, at represents a cyclic shift, $m_0$ represents a cyclic shift index, $n_{CS}$ represents a function of pseudo-random sequence, $n_{s,f}^u$ represents a slot number of a radio frame, l represents an OFDM symbol number in PUCCH transmission, and l' represents an OFDM symbol index in a slot. In the DMRS signal of Equation 5 based on the cyclic shift of Equation 6, i is an orthogonal sequence index and may be determined as illustrated in Table 2.

in uplink control channel format 1 to which a specific symbol is allocated, cyclic shift-based orthogonality is maintained. That is, the cyclic shift of the uplink control channel format 1 may be determined based on Equations 6 and Table 2, and the residual cyclic shift may be identified compared to the cyclic shift of the uplink control channel format 0 determined in Equation 2.

The base station allocates the determined residual cyclic shift to the second terminal. Specifically, the base station allocates the residual cyclic shift of the first format to the second terminal by adjusting the cyclic shift according to the values of $m_0$ and $m_{CS}$ of the uplink control channel format 0 to have different values from the cyclic shift according to the uplink control channel format 3 and format 4.

In the case of uplink control channel format 3, because $m_0$ determining the cyclic shift of the DMRS is 0, the base station may allocate resources to the second terminal at the DMRS location of format 3, and may allocate resources while satisfying orthogonality through the similarity between the signals of format 3 DMRS and format 0 by adjusting the $m_0+m_{CS}$ value of the uplink control channel format 0.

In the case of uplink control channel format 4, the base station may determine $m_0$, which determines the cyclic shift of the DMRS, and adjust the $m_0+m_{CS}$ value of the uplink control channel format 0 accordingly, thereby allocating resources to the second terminal at the format 4 DMRS location. That is, by adjusting the m_0+m_CS value, the base station may additionally allocate resources to 8 to 11 terminals to which format 0 is applied to a format 4 DMRS location capable of allocating 1 to 4.

In the case of format 1, the base station may allocate 4 to 14 symbols to 1 RB. The number of terminals capable of multiplexing is different according to the number of allocated symbols and whether frequency hopping is performed. Classification for each terminal is performed through 12 cyclic shifts on the frequency axis and 7 orthogonal sequences on the time axis. 14 symbols are allocated to a maximum of 84 terminals, and it is possible when frequency hopping is off. In a situation in which only one orthogonal sequence of the time axis is occupied, because terminals may be distinguished through frequency axis cyclic shift classification, channel multiplexing of terminals may be performed within all 14 symbols within the same RB between the uplink control channel format 1 terminal and the uplink control channel format 0 terminal.

That is, the base station may perform channel multiplexing to the terminal through resource allocation based on the similarity between the DMRS signal of any one of uplink control channel formats 1, 3, or 4 in which channel multiplexing is not considered to the terminal and the uplink control channel format 0 signal.

TABLE 2

| | φ | | | | | | |
|---|---|---|---|---|---|---|---|
| $N_{SF,m}^{PUCCH,1}$ | i = 0 | i = 1 | i = 2 | i = 3 | i = 4 | i = 5 | i = 6 |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

As illustrated in <Table 2>, when i=0, $w_i(m)$ becomes 1. When the orthogonal sequence i=0 is allocated to a terminal FIG. 9 is a flowchart 900 illustrating a method of determining whether to allocate resources to a terminal in a wireless communication system according to various embodiments of the disclosure.

Figure 9:
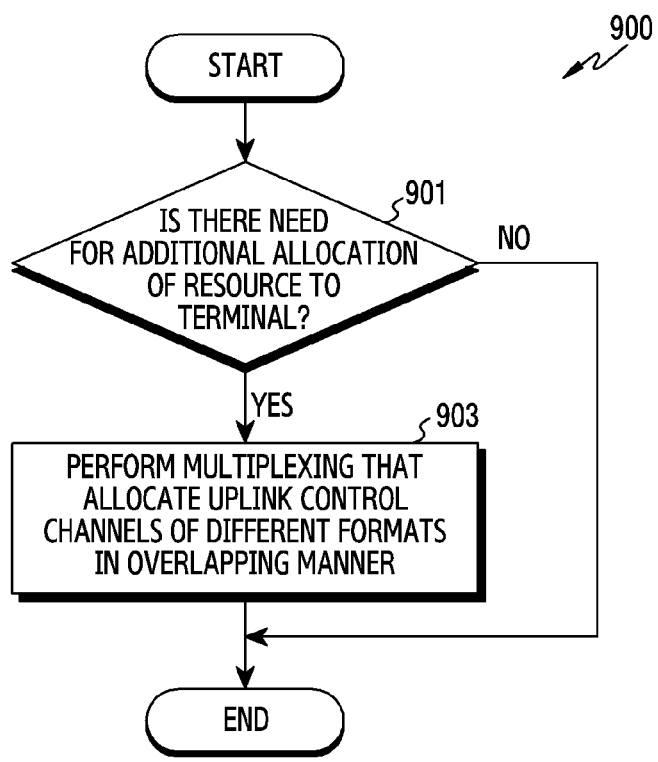
FIG. 9 is a flowchart illustrating a method of determining whether to allocate resources to a terminal in a wireless communication system according to various embodiments of the disclosure.

Referring to FIG. 9, in step 901, the base station determines whether there is a need for additional resource allocation to the terminal. Specifically, the base station determines whether to allocate resources of different uplink control channel formats to the terminal, and the determination criterion may be defined as follows.

As a non-limiting example, the base station may perform channel multiplexing of the terminal regardless of the number of terminals. The base station may allocate uplink control channels of different formats to the terminal in an overlapping manner, even if there is no special condition.

As a non-limiting example, the base station may perform channel multiplexing of the terminal when the number of terminals is greater than or equal to a threshold value. Here, the threshold value is an arbitrary value determined by the operator and may refer to a value determined to achieve a desired effect.

In step 903, the base station performs multiplexing for allocating uplink control channels of different formats in overlapping manner. The base station allocates the residual cyclic shift of the first format to the second terminal by adjusting the cyclic shift of format 0 to have a value different from the cyclic shift of formats 1, 3, and 4. As a result, the base station may perform multiplexing by allocating resources of the uplink control channel based on the similarity between the DMRS signal of any one of formats 1, 3, and 4 in which multiplexing is not considered and the format 0 signal.

Figure 10:
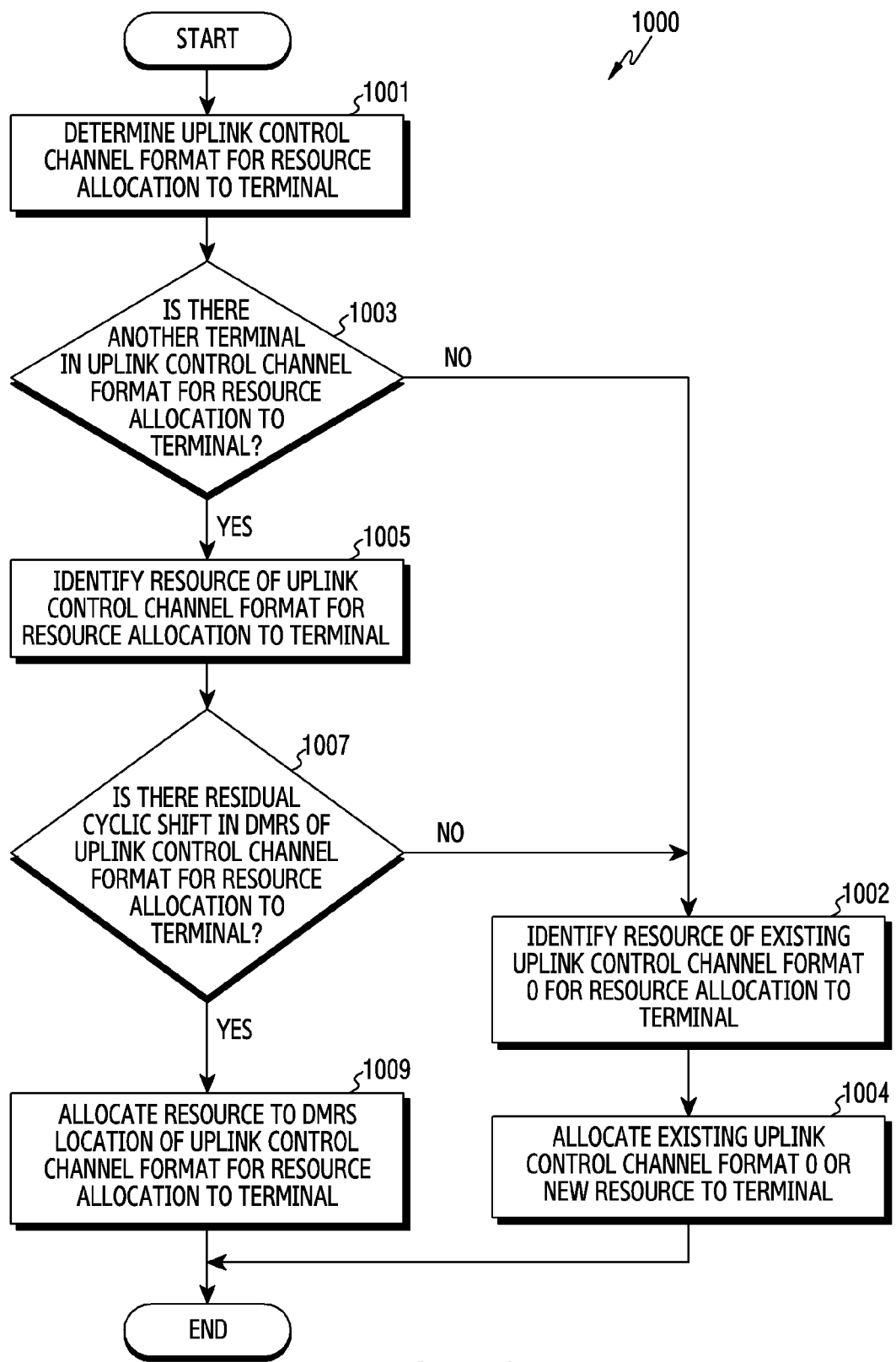
FIG. 10 is a flowchart illustrating allocation of resources to a terminal of uplink control channel format 0 in a wireless communication system according to various embodiments of the disclosure.

FIG. 10 is a flowchart 1000 illustrating allocation of resources to a terminal of uplink control channel format 0 in a wireless communication system according to various embodiments of the disclosure.

Referring to FIG. 10, in step 1001, the base station determines an uplink control channel format for resource allocation to the terminal. Specifically, the base station determines one of formats 1, 3, and 4 as a format including uplink control channel resources to be allocated to the new terminal of format 0.

In step 1003, the base station determines whether another terminal exists in the PUCCH format for resource allocation to the terminal. Specifically, the base station determines whether an existing terminal exists for channel multiplexing of the format 0 new terminal and the existing terminal. When another terminal exists in the uplink control channel format for allocating resources to the new terminal, the base station identifies the resource of the uplink control channel format for resource allocation to the terminal for channel multiplexing of the terminal. On the other hand, when no other terminal exists in the uplink control channel format for resource allocation to the new terminal, the base station identifies the existing format 0 resource for allocating resources to the new terminal, and accordingly allocates the existing uplink control channel format 0 resource or the new resource to the new terminal.

In step 1005, the base station identifies the resource of the uplink control channel format for resource allocation to the terminal. Specifically, in order to allocate the resource of the determined uplink control channel format to the new terminal in step 1001, the base station identifies information on DMRS, symbols, and RBs of the determined uplink control channel format. Here, the information on the DMRS may include at least one or more of the location and the number of DMRSs.

In step 1007, the base station determines whether there is a residual cyclic shift resource in the DMRS of the uplink control channel format for resource allocation to the terminal. Specifically, the base station identifies whether the residual cyclic shift in the DMRS of the uplink control channel format determined in step 1001 and the cyclic shift of the uplink control channel format 0 have unequal values. If there is a residual cyclic shift, channel multiplexing of the terminal is performed by allocating the new terminal to the DMRS location of the uplink control channel format for resource allocation to the new terminal. If there is no residual cyclic shift, the existing uplink control channel format 0 or the new resource is allocated to the new terminal after identifying the resource of the existing uplink control channel format 0.

In step 1009, the base station allocates resources to the DMRS location of the uplink control channel format for resource allocation to the terminal. Specifically, the base station allocates the determined uplink control channel format resource to the new terminal based on the cyclic shift not allocated to the DMRS in the uplink control channel format determined in step 1001.

In step 1002, the base station identifies the resource of the existing uplink control channel format 0 for resource allocation to the terminal. Specifically, the base station identifies the symbol and RB of the existing uplink control channel format 0 to allocate a new resource or a resource of the existing uplink control channel format 0 to the new terminal when channel multiplexing of the terminal is not possible.

In step 1004, the base station allocates the existing uplink control channel format 0 or a new resource to the terminal. Specifically, in order to allocate resources to the new terminal when channel multiplexing of the terminal is not possible, the base station allocates the existing uplink control channel format or new resources to the new terminal based on the resources of uplink control channel format 0 identified in step 1002.

In an environment in which channel multiplexing is not performed to the terminal based on the uplink control channel format 0 signal to the DMRS of the uplink control channel formats 3 and 4, the receiver receiving the DMRS of the uplink control channel formats 3 and 4 receives the DMRS by decorrelating the allocated cyclic shift in a situation in which the fixed cyclic shift in the DMRS of the uplink control channel formats 3 and 4 is allocated. In addition, if the number of UL control channel format 0 allocated to each DMRS is different, whether uplink control channel format 0 is allocated for each DMRS and the number thereof should be transferred from the upper scheduler.

As an example, in the case of uplink control channel format 3, noise estimation is possible only after receiving all of the initial cyclic shift and cyclic shift information of the uplink control channel format 0 allocated for each DMRS and performing channel estimation for each CS.

As an example, resources allocated to a new terminal for channel multiplexing of the terminal may include at least one scheduling request (SR) or a hybrid automatic retransmit request (HARQ-ACK).

The operating method of a base station according to an embodiment of the disclosure as described above may include allocating an uplink control channel of a first format to a first terminal, allocating an uplink control channel of a second format to a second terminal based on resource of the first format, transmitting information on allocation of the uplink control channel, and receiving uplink control information through the uplink control channel.

In one embodiment, the process of allocating an uplink control channel of a second format to a second terminal based on resource of the first format may include identifying location of a demodulation reference signal (DMRS) of the first format allocated to the first terminal, identifying residual cyclic shift of the first format, and allocating the residual cyclic shift to the second terminal.

In one embodiment, the process of identifying residual cyclic shift of the first format may include determining a first cyclic shift of the first format, determining a second cyclic shift of the second format, and identifying a residual cyclic shift based on the first cyclic shift and the second cyclic shift.

In one embodiment, the first format may be one of formats 1, 3, and 4 of a new radio physical uplink control channel (PUCCH), and the second format may be format 0 of the PUCCH.

In one embodiment, determining the first format for resource allocation to the second terminal may be included and determining whether the first terminal exists in the first format for resource allocation to the second terminal may be further included.

In one embodiment, identifying the location of the DMRS of the first format and the number of DMRSs of the first format in order to allocate resources to the second terminal may be further included.

In one embodiment, determining whether to allocate uplink control channels of the first format to the second terminal in an overlapping manner may be further included.

The base station according to an embodiment of the disclosure as described above may include a transceiver and at least one processor connected to the transceiver, and the at least one processor may allocate an uplink control channel of a first format to a first terminal and allocate an uplink control channel of a second format to a second terminal based on a resource of the first format, and the transceiver may transmit information on the allocation of the uplink control channel and receive uplink control information through the uplink control channel.

In one embodiment, the at least one processor may identify a location of a demodulation reference signal (DMRS) of the first format allocated to the first terminal, identify residual cyclic shift of the first format, and allocate the residual cyclic shift to the second terminal.

In one embodiment, the at least one processor may determine a first cyclic shift of the first format, determine a second cyclic shift of the second format, and identify a residual cyclic shift based on the first cyclic shift and the second cyclic shift.

In one embodiment, the first format may be one of formats 1, 3, and 4 of a new radio physical uplink control channel (PUCCH), and the second format may be format 0 of the PUCCH.

In one embodiment, the at least one processor may determine the first format for resource allocation to the second terminal, and determine whether the first terminal exists in the first format for resource allocation to the second terminal.

In one embodiment, the at least one processor may identify the location of the DMRS of the first format for allocating resources to the second terminal, the number of DMRSs, symbols, and RBs.

In one embodiment, the at least one processor may determine whether to allocate uplink control channels of the first format to the second terminal in an overlapping manner.

The operating method of a terminal according to an embodiment of the disclosure as described above may include receiving information on allocation of an uplink control channel from a base station, transmitting uplink control information through the uplink control channel, and the information on the allocation of an uplink control channel may be information on allocation of an uplink control channel of a second format based on a resource of a first format.

In one embodiment, the allocation of an uplink control channel of a second format may be allocated based on a resource of demodulation reference signal (DMRS) location of the first format.

In one embodiment, the first format may be one of formats 1, 3, and 4 of a new radio physical uplink control channel (PUCCH), and the second format may be format 0 of the PUCCH.

The terminal according to an embodiment of the disclosure as described above may include a transceiver and the transceiver may receive information on allocation of an uplink control channel from a base station, and transmit uplink control information through the uplink control channel, and the information on allocation of an uplink control channel may be information on allocation of an uplink control channel of a second format based on a resource of a first format.

In one embodiment, the allocation of an uplink control channel of a second format may be allocated based on a resource of demodulation reference signal (DMRS) location of the first format.

In one embodiment, the first format may be one of formats 1, 3, and 4 of a new radio physical uplink control channel (PUCCH), and the second format may be format 0 of the PUCCH.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a base station in a wireless communication system, the method comprising:
   allocating a first physical uplink control channel (PUCCH) resource of a format 3 to a first terminal;
   identifying a position of a first demodulation reference signal (DMRS) for the first PUCCH resource;
   allocating a second PUCCH resource of a format 0 to a second terminal, the second PUCCH resource is allocated to the position of the first DMRS;
   transmitting information on allocation of the first PUCCH resource and the second PUCCH resource; and
   receiving uplink control information through the first PUCCH resource and the second PUCCH resource,
   wherein the first DMRS and the second PUCCH resource are multiplexed in the position of the first DMRS, and
   wherein a residual cyclic shift of the format 3 is determined for the second terminal.

2. The method of claim 1, wherein allocating the second PUCCH resource of the format 0 to the second terminal comprises:
   identifying the residual cyclic shift of the format 3; and
   allocating the residual cyclic shift to the second terminal.

3. The method of claim 2, wherein identifying the residual cyclic shift of the format 3 comprises:
   determining a first cyclic shift of the format 3;
   determining a second cyclic shift of the format 0; and
   identifying a residual cyclic shift based on the first cyclic shift and the second cyclic shift.

4. The method of claim 1, further comprising:
   determining a first format for resource allocation to the second terminal, and
   determining whether the first terminal is associated with the first format for resource allocation to the second terminal.

5. The method of claim 1, further comprising:
   identifying a number of DMRSs of the format 0 in order to allocate the second PUCCH resource to the second terminal.

6. The method of claim 1, further comprising:
   determining whether to allocate the second PUCCH resource of the format 0 to the second terminal in an overlapping manner.

7. A base station (BS) in a wireless communication system, the base station comprising:
   a transceiver; and
   at least one processor coupled with the transceiver and configured to:
      allocate a first physical uplink control channel (PUCCH) resource of a format 3 to a first terminal,
      identify a position of a first demodulation reference signal (DMRS) for the first PUCCH resource,
      allocate a second PUCCH resource of a format 0 to a second terminal, the second PUCCH resource is allocated to the position of the first DMRS,
      transmit information on the allocation of the first PUCCH resource and the second PUCCH resource, and
      receive uplink control information through the first PUCCH resource and the second PUCCH resource,
      wherein the first DMRS and the second PUCCH resource are multiplexed in the position of the first DMRS, and
      wherein a residual cyclic shift of the format 3 is determined for the second terminal.

8. The BS of claim 7, wherein the at least one processor is further configured to:
   identify the residual cyclic shift of the format 3, and
   allocate the residual cyclic shift to the second terminal.

9. The BS of claim 8, wherein the at least one processor is further configured to:
   determine a first cyclic shift of the format 3,
   determine a second cyclic shift of the format 0, and
   identify a residual cyclic shift based on the first cyclic shift and the second cyclic shift.

10. A method performed by a first terminal in a wireless communication system, the method comprising:
    receiving, from a base station (BS), information on allocation of the first PUCCH resource of a format 3; and
    transmitting uplink control information through the first PUCCH resource,
    wherein a first demodulation reference signal (DMRS) of the first PUCCH resource and a second PUCCH resource for a second terminal are multiplexed in a position of the first DMRS for the first PUCCH resource,
    wherein a residual cyclic shift of the format 3 is determined for the second terminal, and
    wherein the second PUCCH resource of a format 0 is allocated based on the position of the first DMRS for the first PUCCH resource.

11. A first terminal in a wireless communication system, the first terminal comprising:
    a transceiver; and
    at least one processor coupled with the transceiver and configured to:
       receive, from a base station (BS), information on allocation of the first PUCCH resource of a format 3, and
       transmit uplink control information through the first PUCCH resource, and
    wherein a first demodulation reference signal (DMRS) of the first PUCCH resource and a second PUCCH resource for a second terminal are multiplexed in a position of the first DMRS for the first PUCCH resource,
    wherein a residual cyclic shift of the format 3 is determined for the second terminal, and
    wherein the second PUCCH resource of a format 0 is allocated based on the position of the first DMRS for the first PUCCH resource.

12. The BS of claim 7, wherein the at least one processor is further configured to:
    determine a first format for resource allocation to the second terminal, and
    determine whether the first terminal is associated with the first format for resource allocation to the second terminal.

13. The BS of claim 7, wherein the at least one processor is further configured to:
   identify a number of DMRSs of the format 0 in order to allocate the second PUCCH resource to the second terminal.

14. The BS of claim 7, wherein the at least one processor is further configured to:
   determine whether to allocate the second PUCCH resource of the format 0 to the second terminal in an overlapping manner.

* * * * *